US012561337B2

(12) United States Patent
Lundberg

(10) Patent No.: US 12,561,337 B2
(45) Date of Patent: *Feb. 24, 2026

(54) SYSTEM AND METHOD FOR PATENT AND PRIOR ART ANALYSIS

(71) Applicant: Black Hills IP Holdings, LLC, Minneapolis, MN (US)

(72) Inventor: Steven W. Lundberg, Edina, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/935,161

(22) Filed: Nov. 1, 2024

(65) Prior Publication Data

US 2025/0173348 A1 May 29, 2025

Related U.S. Application Data

(63) Continuation of application No. 18/244,902, filed on Sep. 11, 2023, now Pat. No. 12,164,533, which is a
(Continued)

(51) Int. Cl.
*G06F 16/245* (2019.01)
*G06F 16/2455* (2019.01)
(Continued)

(52) U.S. Cl.
CPC .... *G06F 16/24578* (2019.01); *G06F 16/2455* (2019.01); *G06F 16/248* (2019.01); *G06F 16/252* (2019.01); *G06F 16/26* (2019.01);

*G06F 16/93* (2019.01); *G06F 16/9535* (2019.01); *G06F 40/237* (2020.01); *G06Q 10/10* (2013.01);
(Continued)

(58) Field of Classification Search
None
See application file for complete search history.

(56) References Cited

U.S. PATENT DOCUMENTS

| | | | |
|---|---|---|---|
| 8,447,758 B1 * | 5/2013 | Adler | G06F 16/9032 |
| | | | 707/722 |
| 2005/0210009 A1 * | 9/2005 | Tran | G06F 16/9535 |

(Continued)

OTHER PUBLICATIONS

U.S. Appl. No. 13/573,804, filed Oct. 3, 2012, Systems and Methods for Patent Portfolio Management.
(Continued)

*Primary Examiner* — Son T Hoang
(74) *Attorney, Agent, or Firm* — Schwegman Lundberg & Woessner, P.A.

(57) ABSTRACT

Various embodiments of the present disclosure include systems and methods for analyzing patents and prior art in a patent management system. In an example embodiment, a computer-implemented method of determining a potential point of novelty for an identified patent comprises retrieving at least one independent claim of the patent in the claim form as issued; retrieving at least one independent claim of the patent in the claim form as published; and automatically comparing the issued claim to the published claim by identifying unique keywords present in the issued claim but not present in the published claim and flagging the unique keywords to a user.

20 Claims, 7 Drawing Sheets

Related U.S. Application Data continuation of application No. 17/584,343, filed on Jan. 25, 2022, now Pat. No. 11,789,954, which is a continuation of application No. 16/784,234, filed on Feb. 6, 2020, now Pat. No. 11,256,706, which is a continuation of application No. 15/619,150, filed on Jun. 9, 2017, now Pat. No. 10,585,904, which is a continuation of application No. 15/057,047, filed on Feb. 29, 2016, now Pat. No. 9,679,019, which is a continuation of application No. 13/312,507, filed on Dec. 6, 2011, now Pat. No. 9,286,351.

(60) Provisional application No. 61/561,502, filed on Nov. 18, 2011, provisional application No. 61/542,515, filed on Oct. 3, 2011.

(51) Int. Cl.

| | |
|---|---|
| *G06F 16/2457* | (2019.01) |
| *G06F 16/248* | (2019.01) |
| *G06F 16/25* | (2019.01) |
| *G06F 16/26* | (2019.01) |
| *G06F 16/93* | (2019.01) |
| *G06F 16/9535* | (2019.01) |
| *G06F 40/237* | (2020.01) |
| *G06Q 10/10* | (2023.01) |
| *G06Q 50/18* | (2012.01) |

(52) U.S. Cl.

CPC ........ *G06Q 50/184* (2013.01); *G06F 2216/11* (2013.01)

(56) References Cited

U.S. PATENT DOCUMENTS

| | | | | |
|---|---|---|---|---|
| 2006/0224999 | A1* | 10/2006 | Albrecht | G06F 16/338 |
| 2009/0228777 | A1* | 9/2009 | Henry | G06F 16/40 |
| | | | | 707/999.005 |
| 2010/0250340 | A1* | 9/2010 | Lee | G06F 16/2455 |
| 2012/0226683 | A1* | 9/2012 | Pogodin | G06F 16/3323 |
| | | | | 707/723 |
| 2013/0007578 | A1* | 1/2013 | Shreck | G06F 16/24578 |

OTHER PUBLICATIONS

U.S. Appl. No. 13/573,803, filed Oct. 3, 2012, Systems and Methods for Dynamic Contact Management.

U.S. Appl. No. 14/010,376, filed Aug. 26, 2013, Social Media In Patent Portfolio Management.

U.S. Appl. No. 14/010,380, filed Aug. 26, 2013, Mobile Applications In Patent Portfolio Management and Annuity Payments.

U.S. Appl. No. 14/010,391, filed Aug. 26, 2013, Patent Guard Tool.

U.S. Appl. No. 14/010,400, filed Aug. 26, 2013, Patent Troll Monitor.

U.S. Appl. No. 14/483,903, filed Sep. 11, 2014, Systems and Methods for Patent Portfolio Management.

U.S. Appl. No. 15/057,047 U.S. Pat. No. 9,679,019, filed Feb. 29, 2016, System and Method for Patent and Prior Art Analysis.

U.S. Appl. No. 13/312,507 U.S. Pat. No. 9,286,351, filed Dec. 6, 2011, System and Method for Patent and Prior Art Analysis.

U.S. Appl. No. 15/619,150 U.S. Pat. No. 10,585,904, filed Jun. 9, 2017, System and Method for Patent and Prior Art Analysis.

U.S. Appl. No. 16/784,234 U.S. Pat. No. 11,256,706, filed Feb. 6, 2020, System and Method for Patent and Prior Art Analysis.

U.S. Appl. No. 17/584,343 U.S. Pat. No. 11,789,954, filed Jan. 25, 2022, System and Method for Patent and Prior Art Analysis.

U.S. Appl. No. 18/244,902 U.S. Pat. No. 12,164,533, filed Sep. 11, 2023, System and Method for Patent and Prior Art Analysis.

"U.S. Appl. No. 18/244,902, Non Final Office Action mailed Apr. 9, 2024", 24 pgs.

"U.S. Appl. No. 18/244,902, Notice of Allowance mailed Aug. 2, 2024", 12 pgs.

"U.S. Appl. No. 18/244,902, Response filed Jul. 9, 2024 to Non Final Office Action mailed Apr. 9, 2024", 13 pgs.

* cited by examiner

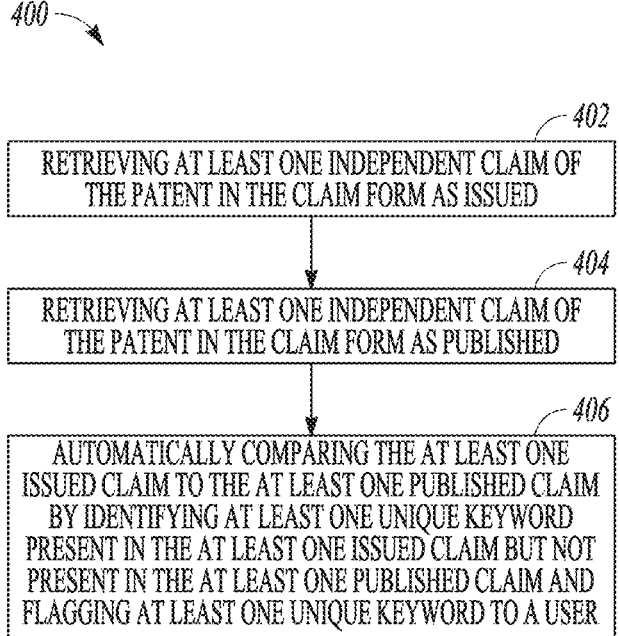

*400*

*402*

RETRIEVING AT LEAST ONE INDEPENDENT CLAIM OF
THE PATENT IN THE CLAIM FORM AS ISSUED

*404*

RETRIEVING AT LEAST ONE INDEPENDENT CLAIM OF
THE PATENT IN THE CLAIM FORM AS PUBLISHED

*406*

AUTOMATICALLY COMPARING THE AT LEAST ONE
ISSUED CLAIM TO THE AT LEAST ONE PUBLISHED CLAIM
BY IDENTIFYING AT LEAST ONE UNIQUE KEYWORD
PRESENT IN THE AT LEAST ONE ISSUED CLAIM BUT NOT
PRESENT IN THE AT LEAST ONE PUBLISHED CLAIM AND
FLAGGING AT LEAST ONE UNIQUE KEYWORD TO A USER

*FIG. 4*

SYSTEM AND METHOD FOR PATENT AND PRIOR ART ANALYSIS

RELATED APPLICATIONS

This application is a continuation of and claims the benefit of priority under 35 U.S.C. § 120 to U.S. patent application Ser. No. 18/244,902, filed on Sep. 11, 2023, which is a continuation of and claims the benefit of priority under 35 U.S.C. § 120 to U.S. patent application Ser. No. 17/584,343, filed on Jan. 25, 2022, which is a continuation of and claims the benefit of priority under 35 U.S.C. § 120 to U.S. patent application Ser. No. 15/619,150, filed on Jun. 9, 2017, which is a continuation of and claims the benefit of priority under 35 U.S.C. § 120 to U.S. patent application Ser. No. 15/057, 047, filed on Feb. 29, 2016, which is a continuation of and claims the benefit of priority under 35 U.S.C. § 120 to U.S. patent application Ser. No. 13/312,507, filed on Dec. 6, 2011, now U.S. Pat. No. 9,286,351, issued on Mar. 15, 2016, which claims the benefit under 35 U.S.C. 119 (e) of U.S. Provisional Patent Application Ser. No. 61/542,515 filed Oct. 3, 2011, which are incorporated herein by reference in their entireties and made a part hereof. This application also claims the benefit under 35 U.S.C. 119 (e) of U.S. Provisional Patent Application Ser. No. 61/561,502 filed Nov. 18, 2011, which is incorporated herein by reference in its entirety and made a part hereof.

BACKGROUND

The management of a patent portfolio involves multiple stages. Initially, a decision must be made as to what inventions are worth the investment of filing a patent application. Then, each filed patent application goes through prosecution with the patent office. Finally, for each patent that is allowed, maintenance fees are usually payable at a variety of intervals to keep the patent in force.

BRIEF DESCRIPTION OF DRAWINGS

Some embodiments are illustrated by way of example and not limitation in the figures of the accompanying drawings in which:

FIG. 4 is a flow chart showing a method, according to an example method embodiment.

DETAILED DESCRIPTION

The life cycle of a patent may include multiple stages. These stages generally include invention, filing a patent application on the invention, prosecuting the patenting application to allowance or abandonment, determining whether to file any continuing applications, and paying maintenance fees on the allowed patent.

At each stage, one or more parties determine the best course of action to take with respect to the invention. For example, when determining whether or not to file a patent, the inventor may know what products are out in the technology area of the invention, a business manager may know how the invention fits in with a company's goals, and a patent attorney may have researched existing patents or application in the technology area of the patent. These parties will ultimately decide whether it is worth the initial investment of filing an application on the invention and then determine the next course of action at each future stage.

In some instances, an inventor, business manager or portfolio manager may wish to monitor the patent activities of one or more competitors. The provision of up-to-date information relating to cited references or technology trends in the art to which a user's or competitor's patent portfolio relates may be particularly helpful in devising patenting strategy or making informed business decisions.

In various embodiments, a patent management system includes tools to help the parties involved in the patenting process make decisions at each stage in the life of a patent. These tools may also be used for general research by parties not immediately involved with the patenting of the invention. Additionally, these tools may be used as standalone tools, in combination with other tools, and in combination with other patent management systems. Examples of tools include, but are not limited to, prosecution analytics, patent analysis, reference management, prior art analytics, docketing management, claim mapping, claim analytics, portfolio analytics, external database (e.g., PAIR) analytics, annuity management, and strategic monitoring.

The systems, methods and tools of the present disclosure set forth in this specification are described in relation to a patent management system and patent matters, but it will be understood that embodiments of the present invention could equally be applied to other forms of intellectual property (trademarks, copyright, registered designs, and the like). Moreover, the term "patent" is not intended to be limited to an issued patent, but may include a pending patent application or un-filed application or invention disclosure. The term "user" is intended to cover any person interacting with the patent management system. A user may be an inventor, portfolio manager, business manager or patent attorney, for example.

Figure 1:
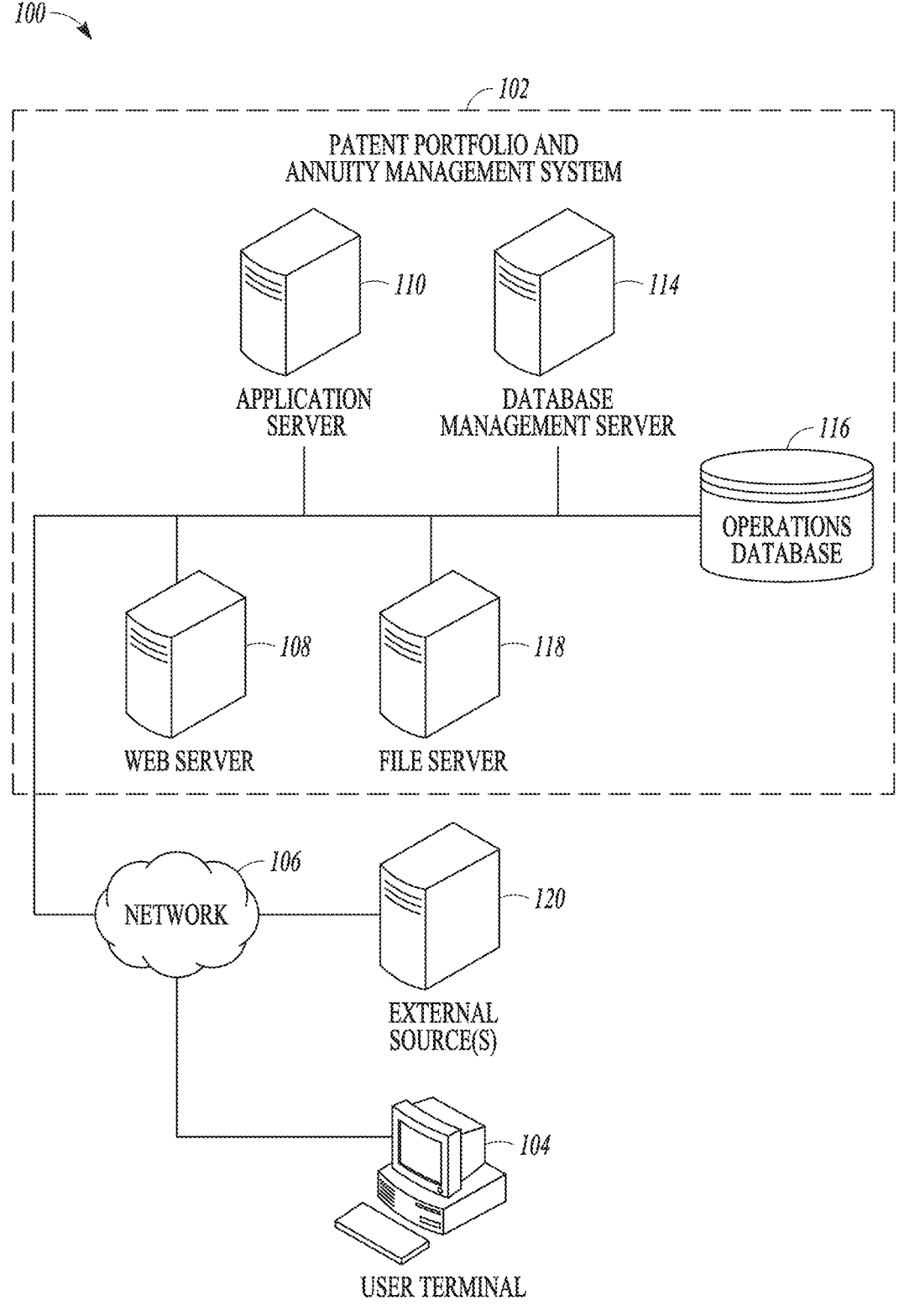
FIG. 1 is a schematic view of computer network system 100 according to various embodiments.

FIG. 1 is a schematic view of computer network system 100 according to various embodiments. The computer network system 100 includes a patent management system 102 (also called a portfolio management system, or annuity management system) and user terminal 104, communicatively coupled via network 106. In an embodiment, patent portfolio and annuity management system 102 includes web server 108, application server 110, database management server 114, which is used to manage at least operations database 116, and file server 118. Patent portfolio and annuity management system 102 may be implemented as a distributed system, for example one or more elements of the management system 102 may be located across a wide-area network from other elements of vehicle evaluation system 102. As another example, a server (e.g., web server 108, file server 118, database management server 114) May represent a group of two or more servers, cooperating with each other, provided by way of a pooled, distributed, or redundant computing model.

Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LAN's or WAN's, such as the Internet. The various devices coupled to network 106 may be coupled to network 106 via one or more wired or wireless connections.

Web server 108 may communicate with file server 118 to publish or serve files stored on file server 118. Web server 108 may also communicate or interface with the application server 110 to enable web-based presentation of information. For example, application server 110 may consist of scripts, applications, or library files that provide primary or auxiliary functionality to web server 108 (e.g., multimedia, file transfer, or dynamic interface functions). In addition, application server 110 may also provide some or the entire interface for web server 108 to communicate with one or more of the other servers in the patent portfolio and annuity management system 102 (e.g., database management server 114). Web server 108, either alone or in conjunction with one or more other computers in management system 102, may provide a user-interface. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous Javascript and XML), Java™, JFC (Java™ Foundation Classes), and Swing (an Application Programming Interface for Java™).

User terminal 104 may be a personal computer or mobile device. In an embodiment, user terminal 104 includes a client program to interface with the management system 102. The client program may include commercial software, custom software, open source software, freeware, shareware, or other types of software packages. In an embodiment, the client program includes a thin client designed to provide query and data manipulation tools for a user of user terminal 104. The client program may interact with a server program hosted by, for example, application server 110. Additionally, the client program may interface with database management server 114.

Operations database 116 may be composed of one or more logical or physical databases. For example, operations database 116 may be viewed as a system of databases that when viewed as a compilation, represent an "operations database." Sub-databases in such a configuration may include a matter database, portfolio database, user database, patent reference document or prior art database, product database, watch database, and mapping database. Operations database 116 may be implemented as a relational database, a centralized database, a distributed database, an object oriented database, or a flat database in various embodiments.

Data stored in a first database may be associated with data in a second database through the use of common data fields. For example, consider entries in the patent database formatted as [Patent ID, Patent Number] and entries in the product database formatted as [Product ID, Product Name, Patent ID]. In this manner, a product entry in the product database is associated with a patent in the patent database through the Patent ID data field. In various embodiments, a product may be associated with more than one patent by creating multiple entries in the product database, one for each patent the product is associated with. In other embodiments, one or more patent reference documents may be associated with a patent by creating multiple entries in the patent database, for example. The formats and data field titles are for illustration purposes and other names and formats may be used. Additionally, further associations between data stored in the databases may be created as discussed further herein.

During operation of patent portfolio and annuity management system 102, data from multiple data sources (internal and external) is imported into or accessed by the operations database 116. Internal sources may include data from portfolio management and annuity payment services affiliated with management system 102. External sources may include websites or databases associated with foreign and domestic patent offices, assignment databases, WIPO, and INPADOC. In various embodiments, the data is scraped and parsed from the websites if it is unavailable through a database. The data may be gathered using API calls to the sources when available. The data may be imported and stored in the operations database on a scheduled basis, such as weekly, monthly, quarterly, or some other regular or periodic interval. Alternatively, the data may be imported on-demand.

After data importation, the data may be standardized into a common format. For example, database records from internal or external sources may not be in a compatible format with the operations database. Data conditioning may include data rearrangement, normalization, filtering (e.g., removing duplicates), sorting, binning, or other operations to transform the data into a common format (e.g., using similar date formats and name formats).

Figure 2:
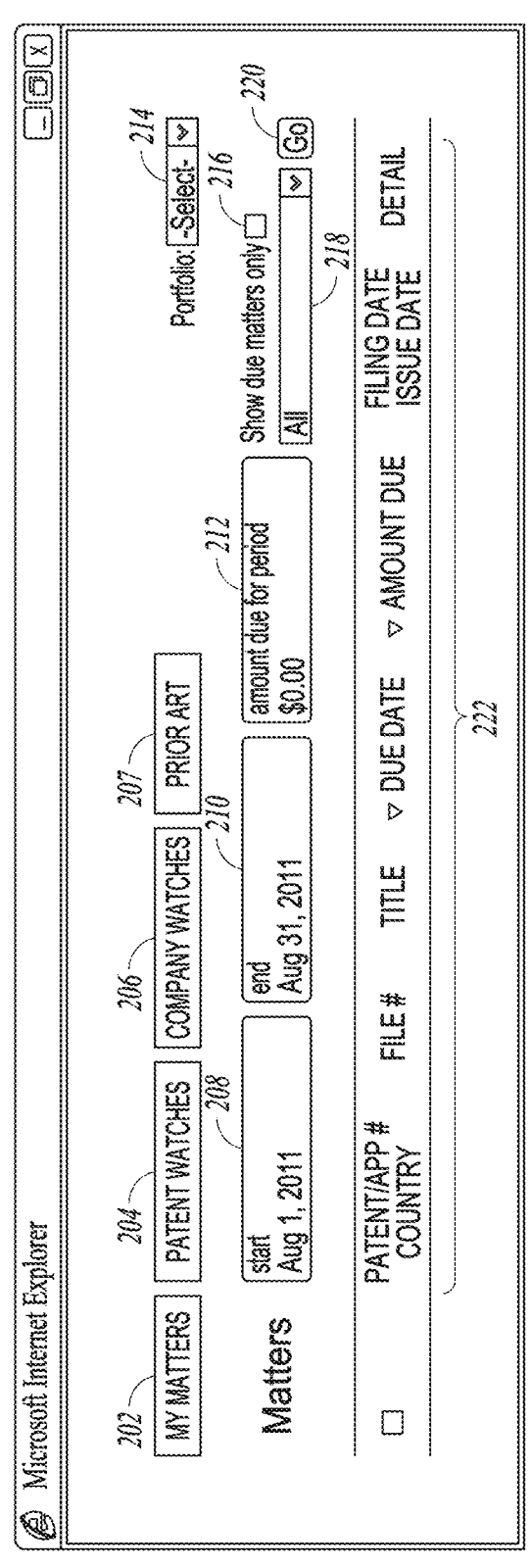
FIG. 2 is a user interface, as may be used in an example embodiment.

FIG. 2 is an example user interface 200 of patent portfolio and annuity management system 102. User interface 200 is illustrated with multiple user interface elements. In an example embodiment, a user interface element is a graphical or textual element that a user may interact with to cause an application to perform an assigned action for the interface element. Data representing user interface 200 may be transmitted via network 106 and presented on a display of user terminal 104 through the use of a web browser. A user (e.g., manager of a patent portfolio) may interact with the user interface elements of user interface 200 through the use of an input device (e.g., stylus, cursor, mouse, finger) of the user terminal. In an embodiment, a user selection is based on the coordinates of the input device as it makes contact with the display or where a user "clicks" the mouse. The coordinates are compared to the coordinates of the user input element to determine the selection. The type of user elements, names, and layout depicted in FIG. 2 are intended to be an illustration of an example user interface of patent portfolio and annuity management system 100. Other types of user elements, names, and layouts may be used.

The user interface elements may include my matters 202, patent watches 204, company watches 206 and prior art 207. These elements may be used to select a context/view of the portfolio and annuity management system. For example, my matters lists the patents included within a portfolio of a user, patent watches lists information on patents that the user has indicated the management system is to watch, and company watches lists information on companies that the user has indicated the system should watch. Prior art element 207 allows a user to perform analysis on prior art. Further details of each of these are included herein.

Date boxes 208 and 210 are user elements that allow a user to select a time period. Amount due box 112 displays the amount due with respect to annuities for patents in the portfolio of the user within the period indicated by date boxes 208 and 210. Upon activating (e.g., clicking) one of the date boxes, a user may be presented with a calendar which allows the selection of a date. Upon selecting a date, the date boxes will update to reflect the user's choice.

Drop-down menu 214 includes a list of portfolios that a user of the management system 102 is authorized to view. For example, before user interface 200 is displayed, a login screen may be presented to the user which requests a user ID and password. In various embodiments, the user ID is associated with one or more portfolios. In turn, each portfolio is associated with one or more matters. Matters may include US and foreign issued patents, pending patents, abandoned patents, and not yet filed applications. Thus, upon selection of a portfolio using drop-down menu 214, user interface 200 is populated with matters associated with the portfolio.

Checkbox 216 is an option to only display matters that currently have an annuity due. Drop-down menu 218 allows further filtering of matters. For example the matters may be filtered by US patents only, US patent applications, and foreign only.

In various embodiments, activation of button 220 updates user interface 200 to reflect the choices made by the user with respect to date boxes 208 and 210, checkbox 216, and drop-down menu 218. For example, amount due box 112 will be updated to reflect the amount due within the new period and the matters listed under column headings 222 may be filtered. In various embodiments, user interface 200 is updated as the user selections are made with respect to elements 208 to 218 without activating button 220.

Figure 3:
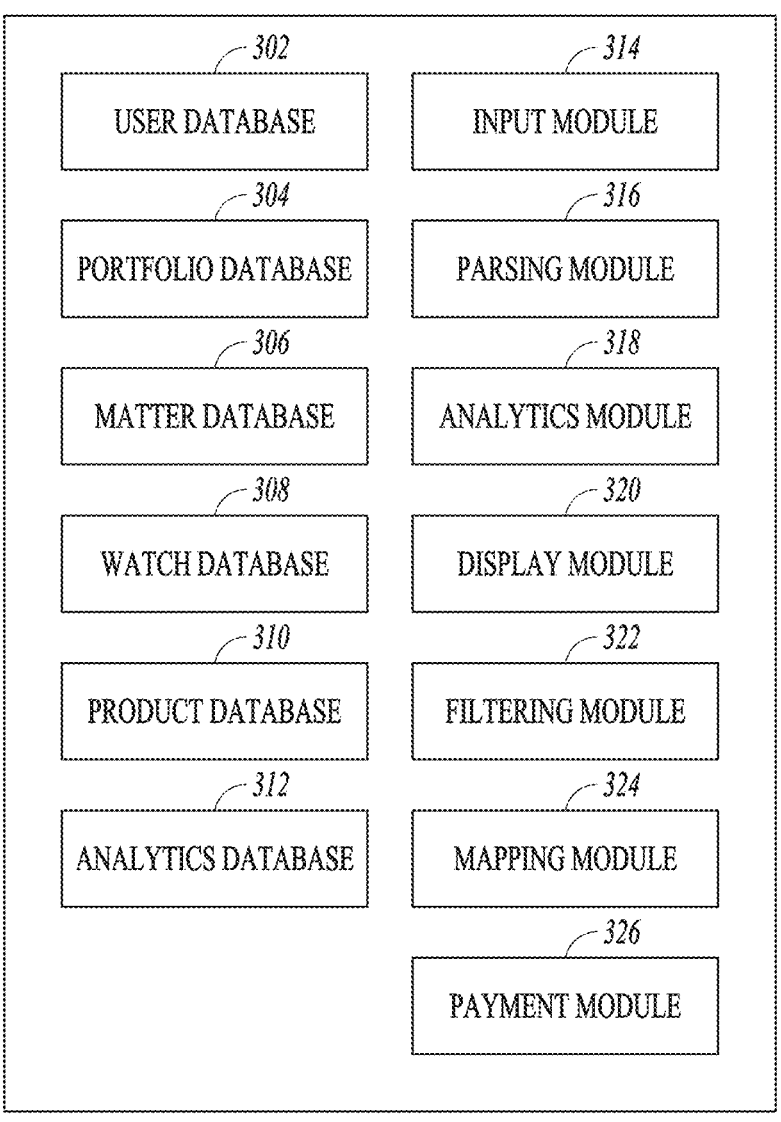
FIG. 3 is a block diagram of a system, according to example embodiments.

FIG. 3 is a block diagram of patent portfolio and annuity management system 102, according to an example embodiment. Illustrated are user database 302, portfolio database 304, matter database 306, watch database 308, product database 310, analytics database 312, input module 314, parsing module 316, analytics module 318, display module 320, filtering module 322, and mapping module 324, and payment module 326. In various embodiments, the data stored in databases 302, 304, 306, 308, and 310 may be in the same or multiple physical locations. For example, portfolio database 304 may be located in one or more computers associated with a portfolio management service. In various embodiments, patent portfolio and annuity management system 102 may mirror databases stored in other locations. In an embodiment, when a request is made to access data stored in the databases, management system 102 determines where the data is located and directs the request to the appropriate location.

In an example embodiment user database 302 stores data representing users of patent portfolio and annuity management system 102. The data may include data fields of user credentials including a user ID and password and access rights with respect to the management system 102. The user ID may be the same as the user ID of other systems associated with management system 102. For example the user ID may be used in a portfolio management system. In this manner, access rights of the user with respect to the portfolio management system may follow to the management system 102. In various embodiments, each user ID is associated with one or more portfolio IDs. Thus, when a user logs into the management system 102, the user is presented with access to only the portfolios that have been associated with the user ID. More or fewer data fields associated with a user may be included in a user entry stored in user database 302.

Portfolio database 304, in an example embodiment, stores data representing portfolios of one or more matters. A matter may include foreign or domestic issued patents in addition to applications. Data stored in portfolio database 304 may initially have been generated in a portfolio management system and imported into patent portfolio and annuity management system 102 through the use of one or more API calls or direct access to the data in the portfolio management system. In various embodiments, a portfolio may be generated by user using the management system 102. For example, user interface may be presented to the user requesting a name in portfolio and identifiers of matters to be included in the portfolio. In an embodiment, a portfolio entry in portfolio database 304 includes data fields of portfolio ID and portfolio name. Additionally, a data field for matter ID may also be included in an entry in the portfolio database. Thus, each portfolio may be associated with one or more matters through the use of the matter ID data field. More or fewer data fields associated with a portfolio may be included in a portfolio entry of portfolio database 304.

In an embodiment, matter database 306 stores data representing matters. Each matter may be associated with one or more portfolios as well as one or more watches. In some embodiments, a matter is associated with no portfolios or watches. In an embodiment, a matter entry includes data fields representing a matter ID, title (e.g., the name of the patent or application), type of the matter (e.g., application, issued patent, PCT application), status of the matter (e.g., issued, abandoned, allowed), a link to the patent office where the matter was filed, a link to a PDF download of the matter, abstract of the matter, inventors of the matter, current owner of the matter, cited references on the face of the matter, filed date, issue date, docket number, and annuity information (e.g., due date, country, and amount due). In some embodiments, other patent reference documents or prior art in any form may be stored and associated with one or more matters. More or fewer data fields associated with a patent may be included in a matter entry stored in matter database 306. In an example embodiment, matter database 306 may store a patent matter database, wherein this database includes data about the patent matters. The data may include for at least one patent matter a claim set or statement of invention and a priority date for the claim set or statement of invention. Matter database 306 may also store a database of prior art documents (also known as "references"), wherein the prior art database includes data about the prior art documents. The data may include for at least one prior art document a priority date or publication date of the document. One or more of the prior art documents may be associated with a first patent matter in the patent matter database.

In various embodiments, a matter is associated with one or more other matters as a family with a family ID. Family members may be priority documents, continuation patents/ applications, divisional patents/applications, and foreign patent/application counterparts. In an embodiment, family information is determined according to an external source such as INPADOC. Patent reference documents and/or other prior art may be manually or automatically stored, cross-cited and associated with related family matters, for example.

In an embodiment, watch database 308 stores data representing user preferences with respect to objects the user wants to track (e.g., watch). In an embodiment, an object is a company or a matter. With respect to matters, a user may indicate a preference to track the matter for any forward citations within a time period (e.g., 60 days, 3 months, etc). Thus, watch database 308 may store entries with a Watch ID that is associated with a User ID and a matter ID. With respect to companies, a user may indicate a preference to watch for publications or issued patents with a timer period. Thus, watch database 308 may store entries with a Watch ID, a user ID, and a company name. In various embodiments, the watches are user ID specific such that no matter what profile the user is viewing, the watches do not change.

In an embodiment, product database 310 stores data representing products. The products may be actual products manufactured by the user, products yet to be released, planned products, products covered in a licensing agreement, or a fictional product. In various embodiments, product database 310 stores entries with a product ID and product name which are associated with a user ID. In various embodiments, a user may tag a product as associated with a matter. Thus, an entry in the product database may also be associated with a matter ID.

In various embodiments, analytics database 312 stores data representing information on matters and companies associated with patent portfolio and annuity management system 102. This information may be organized according to an individual matter, a portfolio, a family, or company. The information may be gathered from internal or external sources of patent portfolio and annuity management system 102 or may be generated by examining the data stored in one or more databases of the management system 102.

In various embodiments, information for an individual matter may include status (e.g., disclosure received, drafting, filed, completed-waiting examination, in prosecution, allowed, issued), cited prior art, list and type of rejections (e.g., 35 U.S.C. § 101, 102, 103) number of claims allowed, office action count, interviews held, IDS statements filed, attorney fees to date, and PTO fees to date. Further metrics for an individual matter stored in analytics database 312 may include, time waiting for examiner, total time in examination, time waiting for PTO while in examination, and time on appeal. Additional prosecution details formatter may include an upcoming docket dates (e.g., due dates for office action, IDS due dates, etc.). A claim prosecution history chart may also be stored in analytics database 312 for each matter. The prosecution history may include a history of claim amendments and arguments made in prosecution.

In various embodiments, analytics for an individual matter may also include data representing a claim chart. The claim chart may include one or more scope concepts on one axis and claims on the other axis. In an embodiment, a scope concept is a textual description of what a patent claim is at least limited to. Thus, if a claim comprises A, B, & C a scope concept may be A. In various embodiments, a scope concept for the claim may be broader than A because the claim will still be limited to the broader scope concept. In an embodiment, the claim charts store mappings between claims and scope concepts. The claim chart may include a variety of levels of granularity of scope concepts. Some claims may be mapped to all of the scope concepts while others may not be mapped to any scope concepts. In various embodiments, the mappings may have already been generated in a program external to the management system (e.g., a portfolio mapping system). In various embodiments, claim charts may be combined at the portfolio level. Thus, a portfolio level chart may include scope concepts for all the claims (or in some examples only the independent claims) in the portfolio.

In various embodiments, portfolio and family analytics information may be stored in analytics database 312 based on aggregating the metrics for an individual matter. In an embodiment, the analytics of a family may differ from those in a portfolio as not all family member matters may be part of a portfolio. Additionally, the analytics may be stored for multiple time periods such that comparisons may be made between metrics currently and metrics a year ago (or other time period).

Aggregated metrics may include a total patents and applications, pending and waiting for examination, in prosecution with no claims allowed, in prosecution with some claims allowed, appealed, notice of allowance received, and issued. These metrics may be compiled for both US and international matters in the portfolio. Additional information may include the international portfolio distribution by country. An age distribution of the portfolio may also be compiled. For example the portfolio may be broken down by less than one year old, 1 to 3 years old, 3 to 5 years old, 5 to 10 years old, 10 to 20 years old, and 20 or more years old. Recent filing and issue activity as well as upcoming Ford filing deadlines may be stored in analytics database 312.

In various embodiments, prosecution metrics across a portfolio or family are determined and stored in analytics database 312. This data may include matters waiting for examination, matters in examination, matters appealed, and cases allowed but not yet issued. Analytics with respect office actions may also be compiled and stored. For example success of allowance after a first office action response, a second response, etc., may be stored in analytics database 312. Additional prosecution analytics may include allowance rate (e.g., 10%) after a telephone interview, allowance after an in-person interview, percentage of interviews with response, number and type of rejection, average time in prosecution (e.g., in months), average time to file a response, and average time to next office action. Further, the list of recently allowed cases, recently appeal cases, stalled cases, and recently abandoned cases may also be stored for each portfolio and family in analytics database 312.

In various embodiments, data stored in the database for group of matters in a portfolio or family is analyzed to determine the top (e.g., ten) most cited patents, the top most cited inventors, top most cited prior art owners (e.g., according to assignment documents or the face of the patent), newly (e.g., within the last 60 days) cited prior art owners, and top most cited prior art inventors. This information may be stored in analytics database 312.

In various embodiments, annuity cost information regarding cost projections for both US issued patents and international patents may also be stored. Upcoming foreign filing deadlines with respect to annuities may also be stored in analytics database 312.

In various embodiments, the results of keyword analysis on one or more matters and/or prior art references may be stored in analytics database 312. The keyword analysis may be based on the occurrences of the keywords in the matter or references to derive a score or keyword overlap.

In various embodiments, input module 314 receives data from multiple sources where it may be further processed by one or more other modules and stored in one or more of databases 302-312. For example, input module 314 may be configured to utilize one or more APIs to data from one or more patent data stores (e.g., public PAIR, private PAIR, INPADOC, foreign patent offices, patent docketing systems, portfolio management systems, etc). The data may include published patent documents (for example, published claims of a patent), issued patent documents (for example, granted claims of a patent), patent applications, office actions or other patent office correspondence, prior art references, claim mappings, dockets dates, and annuity payment data.

In various embodiments, input module 314 is configured to receive input from one or more user interface elements. For example, the management system 102 may present multiple user interfaces to users. These user interfaces may enable users to input data directly into databases 302-312, instruct the management system to retrieve data from patent data stores, and instruct the management system to perform various operations on the data in databases 302-312.

Additionally, input module 314 may be configured to determine the selection of one or more user interface elements by a user and initiate the action associated with the selected user interface element. For example user interface element may include a drop-down menu to select a portfolio. Input module 314 may be configured to receive a selection of the portfolio and a drop-down menu. Then, input module 314 may pass the selection to one or more other modules for further processing. For example, display module 320 may update the drop-down menu to indicate the selection of a portfolio.

In various embodiments, parsing module 316 takes the data that has initially been inputted by input module 314 and formats it according to the data fields of databases 302-312 as discussed above. For example, consider a patent publication that is been inputted by input module 314. Parsing module 316 may use a combination of automatic image recognition and text analysis to determine the filing date, issue date, title, abstract, and claims of the patent. In some embodiments, parsing module 316 may flag certain pieces of data that had been determined to be potentially inaccurate (e.g., a number could not be read). A user of management system 102 may then examine the flagged data and manually enter in the information.

The resulting data that has been parsed by parsing module 316 may then be entered as an entry in one or more of databases 302-312. This may be accomplished by, for example, formulating an SQL query with the parsed information. In various embodiments parsing module 316 may parse multiple piece of information before generating a database entry. For example, input module 314 may receive a docket number for an issued patent. The docket number may be combined with the information parse from the issued patent to form an entry in matter database 306.

In various embodiments, analytics module 318 is configured to examine and run calculations on the data stored in the databases 302-312 to generate the analytics discussed previously. For example, analytics module 318 may formulate an SQL query that retrieves the number of times that a prior art reference has been cited within a portfolio. This query may be run for each prior art cited within the portfolio to determine a list of the most cited (e.g., the top ten) prior art references with a portfolio. In an embodiment, the queries are formulated and run as requested by a user. In an embodiment, once the analytics information has been determined it is stored within analytics database 312. In various embodiments, queries are formulated and run on a period basis (e.g., nightly) and entries in analytics database 312 may be updated to reflect any changes.

In various embodiments, the analytics module 318 is configured to receive input identifying a pool of keywords for a first patent matter in matter database 306 and associated prior art documents in matter database 306. The term keyword is intended to include individual keywords as well as a number of keywords grouped together making up a key phrase, for example. The module 318 may be further configured to perform a keyword analysis on the first patent matter and associated prior art documents based on occurrences of the keywords in the first patent matter and associated prior art documents. The module 318 may be further configured to identify, based on the analysis, keywords occurring uniquely in the first patent matter. In view of their uniquely occurring nature, these keywords may be regarded as claim elements potentially differentiating the claim set or statement of invention over the disclosures contained in the one or more prior art documents.

The analytics module 318 may be further configured to perform the keyword analysis automatically on the first patent matter and the one or more prior art documents simultaneously. Prior art element 207 shown in FIG. 2 may be selected by a portfolio manager to enter further user displays and start the automatic keyword analysis. The analytics module may be further configured to receive synonyms of the keywords to add to the pool of identified keywords. In this way, the keyword analysis may be enhanced.

The analytics module 318 may be further configured to automatically rank the prior art documents based on the degree of differentiation between the first patent matter and the one or more prior art documents, based on the keyword analysis. The analytics module may be further configured to rank the prior art document with the highest degree of differentiation as lowest ranked in potential relevance to the claim set or statement of invention of the first patent matter. Similarly, the analytics module may be further configured to rank the prior art document with the lowest degree of differentiation as highest ranked in potential relevance to the claim set or statement of invention of the first patent matter.

The analytics module 318 may be further configured to derive a keyword differentiation score, based on the keyword analysis, for the one or more prior art documents. The analytics module may be further configured to derive a keyword overlap score, based on the keyword analysis, for the one or more prior art documents.

The analytics module 318 may be further configured to identify the cited inventors or assignees of the prior art documents and automatically rank the prior art documents by inventor or assignee having the most keywords occurring in one or more of the prior art documents.

In an embodiment, display module 320 is configured to display user interfaces and information retrieved from one or more databases 302-312. For example display module 320 may generate user interface 200 of FIG. 2. If a user is accessing management system 102 remotely (e.g., through a web browser) display module 320 may be configured to transmit data representing a user-interface through a network to a user terminal. In various embodiments, display module 320 is configured to generate one or more charts of data stored in databases 302-312. For example, display module 320 may generate a pie chart of the top 10 inventors within a portfolio.

With reference to the keyword analysis described above, display module 320 may be configured to display a user interface visually presenting the ranking of the one or more prior art documents in the user interface. The display module 320 may be further configured to provide, in the user interface, a visual indication of the ranking in a time line.

The display module 320 may be further configured to visually provide, in the user interface, a time line representing the priority date of the first patent matter, and the priority or publication dates of the or each prior art document. The display module may be further configured to provide a visual indication of the degree of differentiation of the one or more prior documents in the time line.

The display module 320 may be further configured to provide, in the user interface, a visual indication of the technology class and/or subclass of the first patent matter and the one or more prior art documents. In an example embodiment, the display module may be further configured to provide, in the user interface, a time line or chart indicating when one or more of the identified keywords first appeared in one or more of the prior art documents.

In various embodiments, filtering module 322 is configured to filter a set of matters according to a user preference. For example, a user may activate a check box that indicates only pending matters should be shown in a user interface. Filtering module 322 may formulate a query consistent with retrieving only pending matters. The results of the query may then be shared with display module 320 where the user interface may be updated.

In various embodiments, mapping module 324 is configured to receive or generate mappings from a product to a matter. This may be accomplished, for example, by receiving a selection of a product by user and a matter by the user. In various embodiments, mapping module 324 is configured to present an automated mapping of the product to a matter for user to confirm or deny. For example, mapping module 324 may present a claim chart for an issued patent to a user. As discussed, the claim chart includes one or more scope concepts that one or more the claims of the patent are limited to. In conjunction with input module 314, mapping module 324, may receive selections of the user of one or more of the scope concepts that are potentially affiliated with the product. Thus, a comparison may be made between what the claims are limited to and what the product may be. For example, if a product, as defined by the selection of one or more scope concepts by the user, is affiliated toward scope concepts A, B, and C and claim 1 of the patent has been mapped to scope concepts A, B, and C, the mapping module 324 may present an option to map the product to the patent. In various embodiments the user may override this recommendation and select to not map the product to the patent. Similarly, a user may indicate that a product is affiliated with the patent even if the scope concepts do not match.

In various embodiments, the mapping module 324 is configured to receive or generate mappings from prior art to a matter. This may be accomplished, for example, by receiving a selection of prior art and a matter by the user. The selection of the prior art may be based on cited references or though other external prior art search. The selections may be conducted manually by a user, or automatically by analytics module 318, for example. In various embodiments, mapping module 324 is configured to present an automated mapping of the prior art to a matter for user to review. In various embodiments, the mapping module can be configured to carry out any of the keyword analysis described above in relation to analytics module 318.

In an embodiment, once the product or prior art mapping information has been determined it is stored within analytics database 312 or matter database 306. In various embodiments, queries are formulated and run on a period basis (e.g., nightly) and entries in analytics database 312 or matter database 306 may be updated to reflect any changes.

In various embodiments, payment module 326 is configured to receive selections by the user of which annuities to pay for matters in a portfolio. Additionally, payment module 326 may receive user preferences related to the payment of the annuities. Payment module 326 may receive payment information from a user and forward the payment information to the appropriate agency/office. In some embodiments, the annuity management system 102 organizes payment of the annuity on behalf of the user and the user pays annuity management system 102.

In various embodiments, a system 102 for determining a potential point of novelty of an identified patent may comprise any one or more of the modules 314-326 herein described operating or configured to perform at least a portion of one or more of the following: retrieve at least one independent claim of the patent in the claim form as issued; retrieve at least one independent claim of the patent in the claim form as published; and automatically compare the issued claim to the published claim by identifying unique keywords present in the issued claim but not present in the published claim and flag the unique keywords to a user.

In various embodiments, at least one or more of the modules 314-326 is further to receive input from a user identifying prior art, retrieve the prior art, and perform a keyword analysis on the prior art using the unique keywords. In some embodiments, at least one or more of the modules 314-326 is further to identify common keywords present in both the published and issued claims and perform a keyword analysis on the prior art using the common keywords. In some embodiments, at least one or more of the modules 314-326 is further to cross-reference the unique keywords to passages in the patent specification. In some embodiments, at least one or more of the modules 314-326 is further to receive input from a user manually adding synonyms of the unique keywords to the pool of identified keywords. At least one or more of the modules 314-326 may further be provided to rank automatically the prior art documents based on the occurrences of the unique keywords in the prior art.

In various embodiments, a system 102 for determining a potential point of novelty of an identified patent may comprising a network 106; a patent matter database (for example, external source 120 or database 306), accessible on the network, and including data about the patent; a prior art database (for example, external source 120 or database 306), accessible on the network, and including data about prior art documents; a server (for example, a server 110, or 114, or 108, or 118) operatively connected to the network, wherein the server includes (see, for example, FIG. 7): a processor, a memory, software operable on the processor to retrieve at least one independent claim of the patent in the claim form as issued; retrieve at least one independent claim of the patent in the claim form as published; automatically compare the issued claim of the patent to the published claim of the patent by identifying unique keywords present in the issued claim but not present in the published claim, and flag the unique keywords to a user. The software may be further operable on the processor to perform a keyword analysis, using the unique keywords present in the issued claim, on at least a portion of the prior art documents.

Some embodiments of the present inventive subject matter include methods for electronic analysis of a patent and prior art in a patent management system 102. One such embodiment is illustrated in FIG. 4. In some embodiments, a computer-implemented method 400 of determining a potential point of novelty for an identified patent comprises: at block 402, retrieving at least one independent claim of the patent in the claim form as issued; at block 404, retrieving at least one independent claim of the patent in the claim form as published; and at block 406, automatically comparing the at least one issued claim to the at least one published claim by identifying unique keywords present in the at least one issued claim but not present in the at least one published claim and flagging at least one unique keyword to a user. In some embodiments, dependent claims as published and issued may be compared.

In some embodiments, the method 400 may further comprise identifying prior art and performing a keyword analysis, using the at least one unique keyword present in the at least one issued claim, on the prior art. In further embodiments, the method 400 may further comprise identifying common keywords present in both the at least one published and issued claims, with the keyword analysis being performed on the prior art using the common keywords.

In various embodiments, the method 400 may comprise cross-referencing the unique keywords to passages in the patent specification. In some embodiments, the method further comprises manually adding synonyms of the unique keywords to the pool of identified keywords. The method may still further comprise automatically ranking the prior art documents based on the occurrences of the unique keywords in the prior art.

Figure 5:
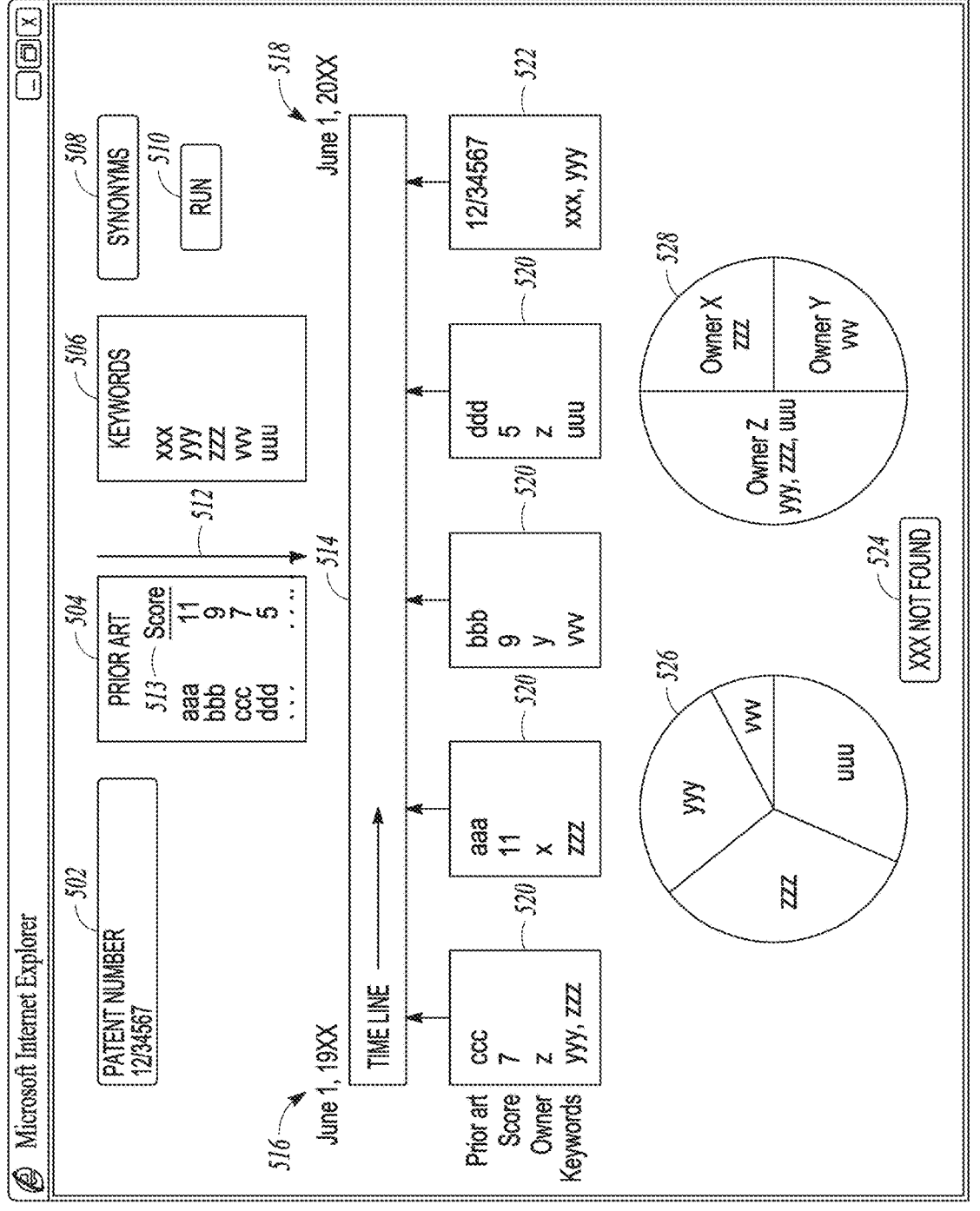
FIG. 5 is a user interface, as may be used in an example embodiment.

Reference is now made to FIG. 5 which shows a user interface 500 which may be used to facilitate the methods of the present inventive subject matter, according to example embodiments. The user interface 500 may be displayed by display module 320 described above. The user interface may be provided in a computer monitor or mobile device. The type of user elements, names, and layout depicted in FIG. 5 are intended to be an illustration of an example user interface of patent portfolio and annuity management system 100. Other types of user elements, names, and layouts may be used.

Shown at element 502 is the identification of a first patent matter in the patent matter database stored in matter database 306. Associated with the patent matter, either automatically by the system 102 or manually by a portfolio manager for example, are one or more prior art documents stored in a prior art database also contained, in this example embodiment, in the matter database 302. The identity of these prior art documents is shown in user element 504. The prior art documents may be sourced through citation by a patent office or by a patentability search conducted by a portfolio manager, for example.

A pool of keywords is shown in user element 506. The keywords may be manually selected by a portfolio manager, for example, or generated automatically by the system 102. Synonyms of the keywords may be entered manually at element 508 so that the keyword analysis described in method 400 above may be enhanced and, if necessary, performed again by selecting user element 510 marked "Run". The keywords may be used to perform a keyword analysis in accordance with any one or more of the method embodiments or systems described above.

In some example embodiments, once the keyword analysis has been performed, the prior art documents are ranked based on their degree of differentiation from patent matter in element 502 as shown by arrow 512. The most relevant prior art document (i.e., with the most occurrences of a given keyword present in the patent matter 502) may be shown at the top of the ranking list in element 504, while less relevant prior art documents (i.e., with fewer occurrences of such keywords) may follow further down in the list. The ranking order may be reversed. Each prior art document may be accorded a keyword differentiation or keyword overlap score as shown at 513. In this way, a portfolio manager seeking to make an informed decision about whether to file or renew a given patent matter can quickly ascertain the potential relevance of prior art impacting the claim set or statement of invention in patent matter 502 under review.

In yet further example embodiments, a time line may be provided as shown at user element 514. The time line may run from a given date in the further past, as shown for example at 516, to a more recent date as shown for example at 518. Spread along the timeline 514, in accordance with their priority or publication dates, are the respective prior art documents listed in element 504. User elements 520 may be used to display details of the prior art documents, such as the differentiation or overlap scores, the prior art owner (assignee or inventors), and the keywords occurring in the respective prior art documents. A user element 522 may be provided to display similar details for the patent matter, including for example the identity of keywords (in the illustrated example "xxx") not found in any of the prior art documents. A similar conclusion may be presented in element 524.

In yet further example embodiments, pie charts 526 and 528 may be displayed illustrating, for example, the number of occurrences of keywords in the prior art (as shown in 526) or the extent to which the various owners of the prior art own the more relevant prior art documents (in 528).

Figure 6:
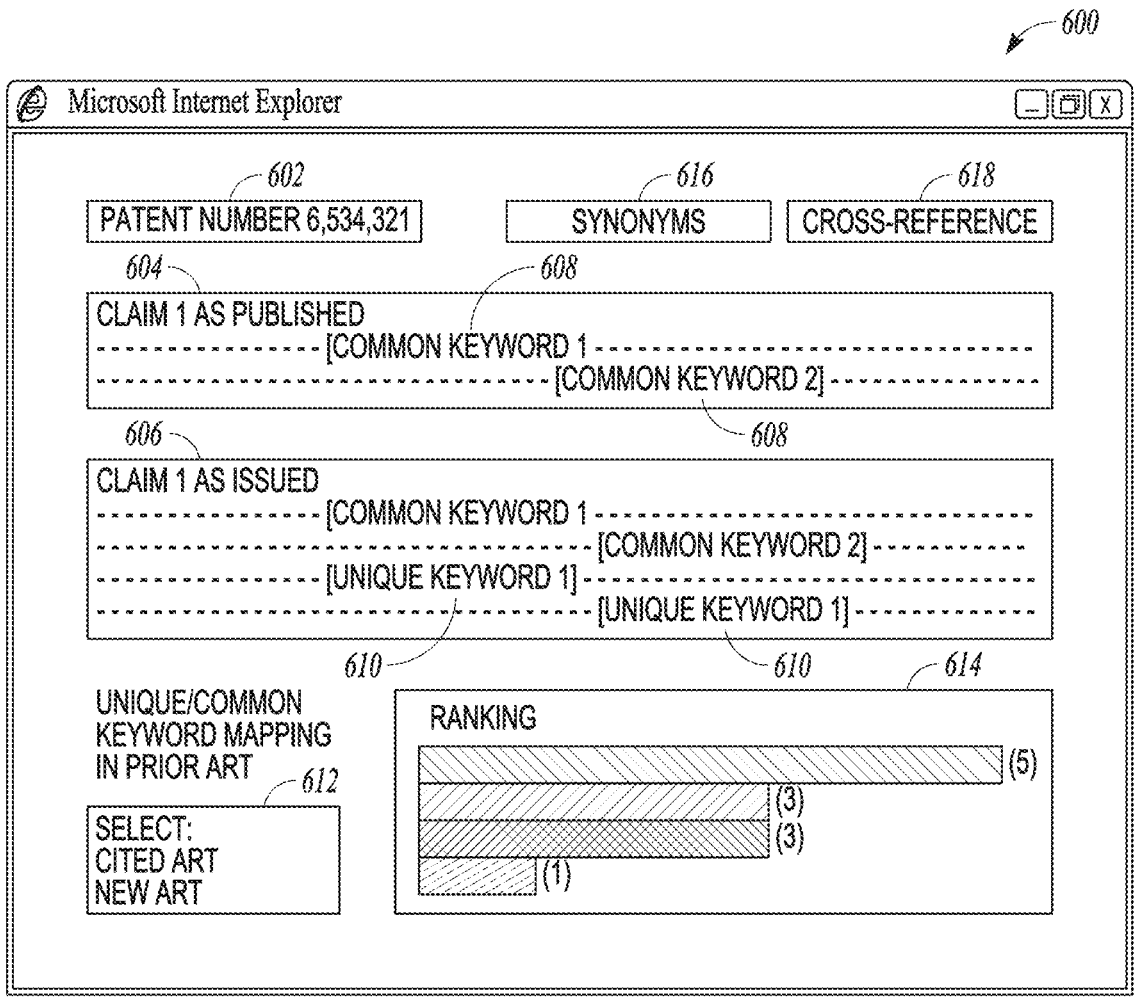
FIG. 6 is another user interface, as may be used in an example embodiment.

Reference is now made to FIG. 6 which shows a user interface 600 which may be used to facilitate the methods of the present inventive subject matter, according to example embodiments. The user interface 600 may be displayed by display module 320 described above. The user interface may be provided in a computer monitor or mobile device. The type of user elements, names, and layout depicted in FIG. 6 are intended to be an illustration of an example user interface of patent management system 102. Other types of user elements, names, and layouts may be used.

At user element 602, the number of an identified patent is shown. The patent may be selected and entered by a user, or identified by the system through patent search, or identified in any other way. The patent may be a known key patent for a competitor, for example, and might be "in the way" of the user's planned product launch, for example. The user might quickly want to know what point(s) of novelty (if any) can be ascribed to the granted claims to assist in identifying design-around opportunities or compiling an invalidity attack. A patent analysis tool according to one embodiment of the present provides ready information. After the user has entered the patent number into element 602, claim 1 (as an example independent claim of the patent) in the claim form "as published" is set out in display window 604. Claim 1 of the patent in the claim form "as issued" is set out in window 606. One or more of the modules 314-326 operates or is generally configured to retrieve these claims electronically from an internal or external database. Other independent or dependent claims may be retrieved and displayed in similar manner.

One or more of the modules, typically the analytics module 318, then compares the claims to identify "common" keywords present in both the published or issued claims, and displays or flags these in the display window 604. A highlighter color may be used to flag the common keywords. In similar manner, the analytics (or other) module 318 compares the claims to identify "unique" keywords present only in the issued claims and flag these to a user in window 606. The unique keywords serve to identify potential points of novelty for the patent since these claim elements will typically have been inserted into the published claim during examination in the light of prior art.

A display of the occurrences of the common or unique keywords in the art cited during examination, made of record, located in a novelty search, or identified in any other way can be selected by using selection element 612. A ranking of the art, based on the number of occurrences, is provided in window 614.

In some embodiments, synonyms of the common or unique keywords may be manually entered by a user at element 616. This auxiliary entry may assist in identifying further points of novelty for the patent, or in finding anticipatory passages in the prior art, as the case may be. Further user element 618 allows a user to cross-reference the common or unique keywords (or synonyms) in the patent specification. So, for example, if a user wanted to find written description (or fair basis) in the patent specification for the keyword claim elements, this feature of the patent analysis tool can be used to facilitate such a search.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures usually require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
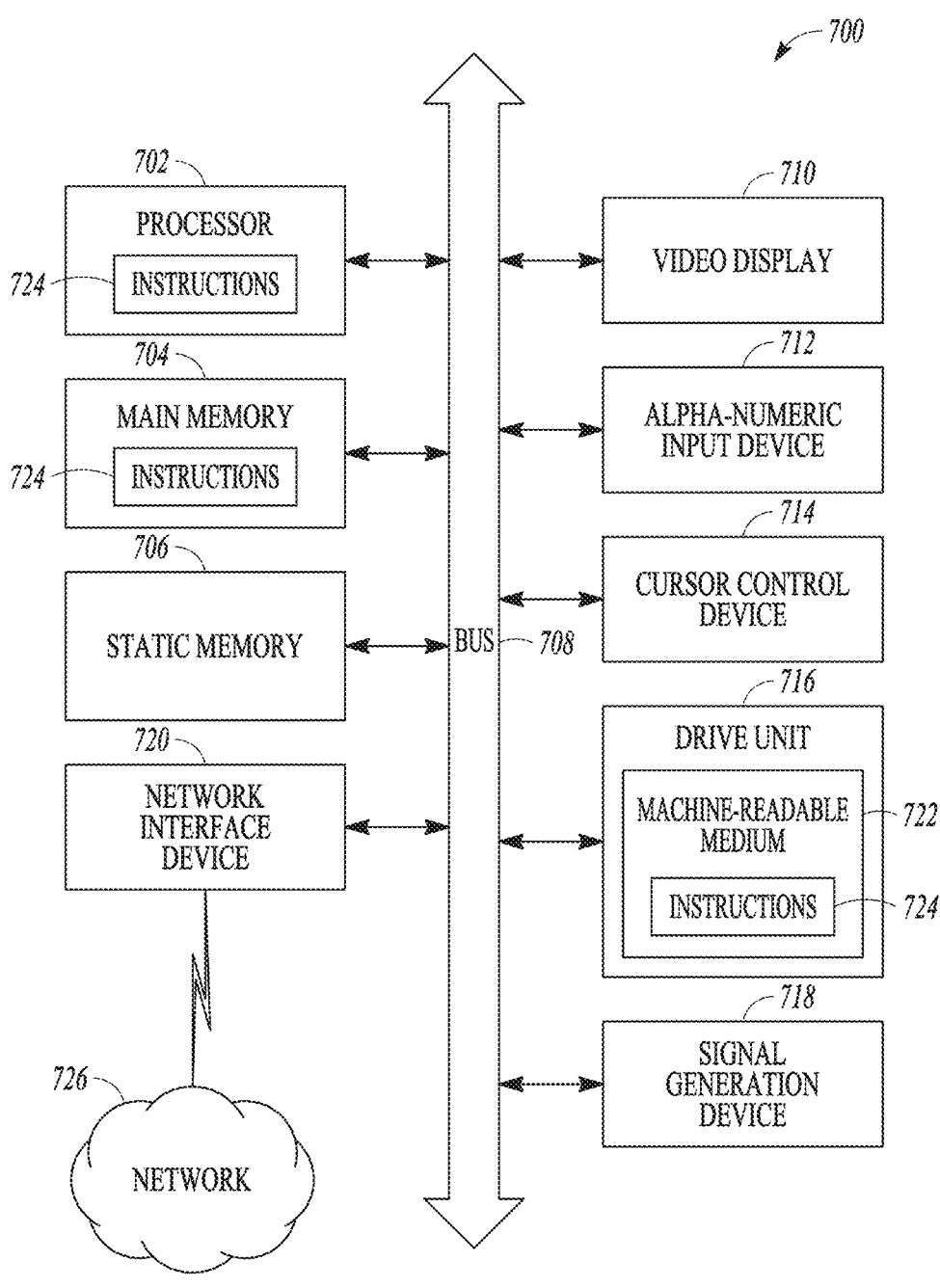
FIG. 7 is a block diagram of machine in the example form of a computer system within which a set of instructions may be executed for causing the machine to perform any one or more of the methodologies herein discussed.

FIG. 7 is a block diagram of machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation or cursor control device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more data structures or instructions 724. The term "machine-readable medium" shall also be taken to include any tangible medium that is capable of storing, encoding or carrying instructions for execution by the machine and that cause the machine to perform any one or more of the methodologies of the embodiments of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Non-Limiting Embodiments

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method for generating a visualization of ranked prior art documents relevant to a patent claim comprising:

responsive to a request received from a user through a user interface, automatically comparing an issued independent patent claim to a pre-allowance published independent patent claim by identifying at least one unique keyword present in the issued independent patent claim but not present in the pre-allowance published independent patent claim;

formulating a search query string comprising the at least one unique keyword;

executing a search query, to a prior art database comprising a set of prior art documents, using the search query string to identify a result prior art document set;

identifying an owner of each prior art document of the result prior art document set;

automatically ranking prior art documents in the prior art documents set based on a number of keywords from the search query string occurring in prior art documents from the result prior art document set, wherein the ranked prior art documents are grouped by the identified owner; and outputting a user interface to the user comprising the visualization of the ranked prior art documents that identifies the owner of each group of prior art documents.

2. The computer-implemented method of claim 1, further comprising:

automatically ranking the result prior art document set based on a degree of differentiation between the identified patent and one or more prior art documents from the result prior art document set, the rank based on keyword analysis using keywords of the search query string, wherein a highest degree of differentiation is lowest ranked in potential relevance to the issued independent patent claim, and wherein a lowest degree of differentiation is highest ranked in potential relevance to the issued independent patent claim.

3. The computer-implemented method of claim 1, further comprising:

cross-referencing the at least one unique keyword to a passage in a specification of the identified patent using input received from the user interface; and displaying the passage in the specification of the identified patent in the user interface.

4. The computer-implemented method of claim 1, further comprising:

identifying a common keyword present in the issued independent patent claim and the pre-allowance published independent patent claim;

upon receiving an identity of a second prior art document from the result prior art document set, calculating a common keyword overlap score for the second prior art document based on occurrences of the common keyword in the second prior art document; and displaying a graphical representation of the identity of the second prior art document, the common keyword, and the common keyword overlap score, wherein the graphical representation is displayed along a graphical timeline based on a priority date of the second prior art document.

5. The computer-implemented method of claim 4, further comprising:

displaying, in the user interface, the pre-allowance published independent patent claim and the issued independent patent claim; and flagging occurrences of the at least one unique keyword and the common keyword in the display of the pre-allowance published independent patent claim and the issued independent patent claim.

6. The computer-implemented method of claim 4, wherein the graphical timeline includes a set of prior art documents including a first prior art document of the result prior art document set, wherein the graphical timeline includes an indication of a start date of the graphical timeline and an end date of the graphical timeline, and wherein the start date corresponds to an earliest priority date of a prior art document included in the result of prior art document set and the end date corresponds to a latest priority date of a prior art documents included in the result prior art document set.

7. The computer-implemented method of claim 1, further comprising:

identifying synonyms corresponding to the at least one unique keyword; and calculating a unique keyword overlap score for a first prior art document of the result prior art document set by determining occurrences of the synonyms in the first prior art document.

8. A system for generating a visualization of prior art relevant to a patent claim comprising:

at least one processor; and memory including instructions that, when executed by the at least one processor, cause the at least one processor to perform operations to:

responsive to a request received from a user through a user interface, automatically compare an issued independent patent claim to a pre-allowance published independent patent claim by identifying at least one unique keyword present in the issued independent patent claim but not present in the pre-allowance published independent patent claim;

formulate a search query string comprising the at least one unique keyword;

execute a search query, to a prior art database comprising a set of prior art documents, using the search query string to identify a result prior art document set;

identify an owner of each prior art document of the result prior art document set;

automatically rank prior art documents in the prior art documents set based on a number of keywords from the search query string occurring in prior art documents from the result prior art document set, wherein the ranked prior art documents are grouped by the identified owner; and output a user interface to the user comprising the visualization of the ranked prior art documents that identifies the owner of each group of prior art documents.

9. The system of claim 8, the memory further comprising instructions that, when executed by the at least one processor, cause the at least one processor to perform operations to:

automatically rank the result prior art document set based on a degree of differentiation between the identified patent and one or more prior art documents from the result prior art document set, the rank based on keyword analysis using keywords of the search query string, wherein a highest degree of differentiation is lowest ranked in potential relevance to the issued independent patent claim, and wherein a lowest degree of differentiation is highest ranked in potential relevance to the issued independent patent claim.

10. The system of claim 8, the memory further comprising instructions that, when executed by the at least one processor, cause the at least one processor to perform operations to:

cross-reference the at least one unique keyword to a passage in a specification of the identified patent using input received from the user interface; and display the passage in the specification of the identified patent in the user interface.

11. The system of claim 8, the memory further comprising instructions that, when executed by the at least one processor, cause the at least one processor to perform operations to:

identify a common keyword present in the issued independent patent claim and the pre-allowance published independent patent claim;

upon receiving an identity of a second prior art document from the result prior art document set, calculate a common keyword overlap score for the second prior art document based on occurrences of the common keyword in the second prior art document; and display a graphical representation of the identity of the second prior art document, the common keyword, and the common keyword overlap score, wherein the graphical representation is displayed along a graphical timeline based on a priority date of the second prior art document.

12. The system of claim 11, the memory further comprising instructions that, when executed by the at least one processor, cause the at least one processor to perform operations to:

display, in the user interface, the pre-allowance published independent patent claim and the issued independent patent claim; and flag occurrences of the at least one unique keyword and the common keyword in the display of the pre-allowance published independent patent claim and the issued independent patent claim.

13. The system of claim 11, wherein the graphical timeline includes a set of prior art documents including a first prior art document of the result prior art document set, wherein the graphical timeline includes an indication of a start date of the graphical timeline and an end date of the graphical timeline, and wherein the start date corresponds to an earliest priority date of a prior art document included in the result of prior art document set and the end date corresponds to a latest priority date of a prior art documents included in the result prior art document set.

14. The system of claim 8, further comprising instructions that, when executed by the at least one processor, cause the at least one processor to perform operations to:

identify synonyms corresponding to the at least one unique keyword; and calculate a unique keyword overlap score for a first prior art document of the result prior art document set by determining occurrences of the synonyms in the first prior art document.

15. At least one non-transitory machine-readable medium comprising instructions for generating a visualization of prior art relevant to a patent claim that, when executed by at least one processor, cause the at least one processor to perform operations to:

responsive to a request received from a user through a user interface, automatically compare an issued independent patent claim to a pre-allowance published independent patent claim by identifying at least one unique keyword present in the issued independent patent claim but not present in the pre-allowance published independent patent claim;

formulate a search query string comprising the at least one unique keyword;

execute a search query, to a prior art database comprising a set of prior art documents, using the search query string to identify a result prior art document set;

identify an owner of each prior art document of the result prior art document set;

automatically rank prior art documents in the prior art documents set based on a number of keywords from the search query string occurring in prior art documents from the result prior art document set, wherein the ranked prior art documents are grouped by the identified owner; and output a user interface to the user comprising the visualization of the ranked prior art documents that identifies the owner of each group of prior art documents.

16. The at least one non-transitory machine-readable medium of claim 15, further comprising instructions that, when executed by the at least one processor, cause the at least one processor to perform operations to:

automatically rank the result prior art document set based on a degree of differentiation between the identified patent and one or more prior art documents from the result prior art document set, the rank based on keyword analysis using keywords of the search query string, wherein a highest degree of differentiation is lowest ranked in potential relevance to the issued independent patent claim, and wherein a lowest degree of differentiation is highest ranked in potential relevance to the issued independent patent claim.

17. The at least one non-transitory machine-readable medium of claim 15, further comprising instructions that, when executed by the at least one processor, cause the at least one processor to perform operations to:

cross-reference the at least one unique keyword to a passage in a specification of the identified patent using input received from the user interface; and display the passage in the specification of the identified patent in the user interface.

18. The at least one non-transitory machine-readable medium of claim 15, further comprising instructions that, when executed by the at least one processor, cause the at least one processor to perform operations to:

identify a common keyword present in the issued independent patent claim and the pre- allowance published independent patent claim;

upon receiving an identity of a second prior art document from the result prior art document set, calculate a common keyword overlap score for the second prior art document based on occurrences of the common keyword in the second prior art document; and display a graphical representation of the identity of the second prior art document, the common keyword, and the common keyword overlap score, wherein the graphical representation is displayed along a graphical timeline based on a priority date of the second prior art document.

19. The at least one non-transitory machine-readable medium of claim 18, further comprising instructions that, when executed by the at least one processor, cause the at least one processor to perform operations to:

display, in the user interface, the pre-allowance published independent patent claim and the issued independent patent claim; and flag occurrences of the at least one unique keyword and the common keyword in the display of the pre-allowance published independent patent claim and the issued independent patent claim.

20. The at least one non-transitory machine-readable medium of claim 18, wherein the graphical timeline includes a set of prior art documents including a first prior art document of the result prior art document set, wherein the graphical timeline includes an indication of a start date of the graphical timeline and an end date of the graphical timeline, and wherein the start date corresponds to an earliest priority date of a prior art document included in the result of prior art document set and the end date corresponds to a latest priority date of a prior art documents included in the result prior art document set.

* * * * *